United States Patent
Mattinson

[11] 3,949,444
[45] Apr. 13, 1976

[54] CASTORS

[75] Inventor: Frederick Mattinson, Andover, England

[73] Assignee: Martin-Thomas Limited, Andover, England

[22] Filed: Aug. 23, 1974

[21] Appl. No.: 500,185

[30] Foreign Application Priority Data
Sept. 4, 1973  United Kingdom............... 41536/73

[52] U.S. Cl................................................ 16/35 R
[51] Int. Cl.² ........................................ B60B 33/00
[58] Field of Search ......................... 16/35 R, 35 D

[56] References Cited
FOREIGN PATENTS OR APPLICATIONS
882,617  11/1961  United Kingdom................ 16/35 R
1,102,262  2/1968  United Kingdom................ 16/35 R Primary Examiner—H. Hampton Hunter
Attorney, Agent, or Firm—Dowell & Dowell

[57] ABSTRACT

This invention relates to castors, for example for builders' staging and hospital beds. The castor includes an upright spindle on which wheel-carrying plates are mounted, a wheel having an axle extending through openings in the plates, a wheel braking device, cam means for moving the axle along the openings to and from a braking position, said openings being of constant depth so that the axle has substantially no play and the cam means has cam slots so shaped that movement of the cam plates causes braking device to engage the wheel firmly when not loaded, the load being then shared by the axle and the wheel.

4 Claims, 5 Drawing Figures

U.S. Patent   April 13, 1976   Sheet 3 of 3   3,949,444
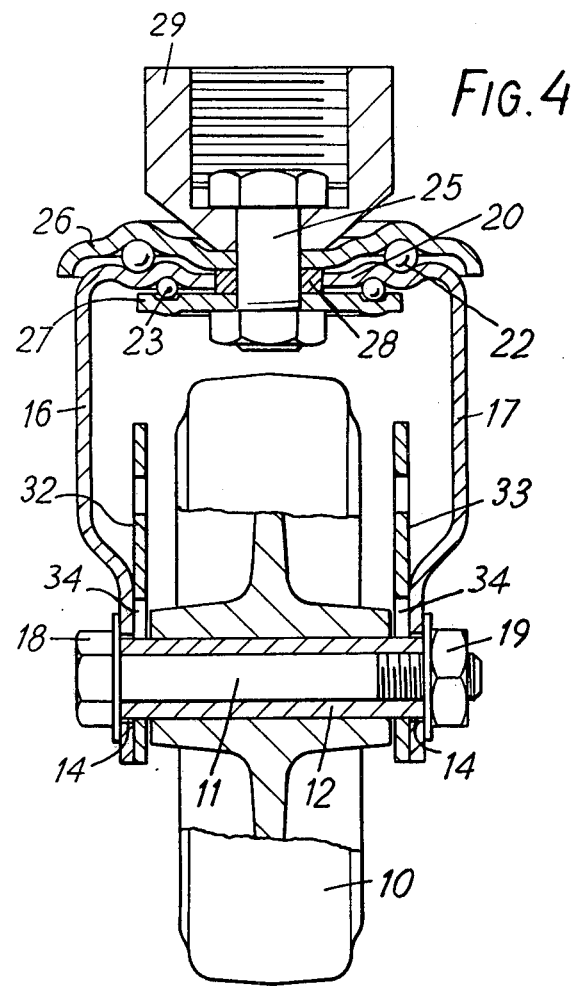
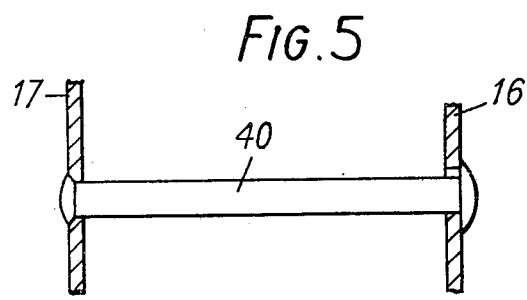

CASTORS

This invention relates to castors for use on builders' staging, hospital beds and other devices that require to be wheeled along at times and locked against movement at other times by braking the wheels of the castors.

A castor of this kind forms the subject of British Patent No. 882617 (Martin Thomas Limited) according to which the castor comprises a wheel carrying device including an upright spindle and wheel carrying plates spaced apart from each other and carried by the lower end of the spindle, a wheel having an axle, said axle extending through openings in the plates, a wheel braking surface carried by said device and cam plates pivoted on the axle carrying plates for moving the wheel axle along the openings from a position where the wheel is spaced from the braking surface to a position where the top part of the wheel is engaged by said braking surface, said openings in the plates being elongated on a horizontal line and having adjacent ends located directly below the vertical axis of the spindle where they are enlarged vertically to give the axle a small vertical play; said cam plates having cam slots therein engaged by the axle and being pivoted on the wheel carrying plates at their ends remote from said enlarged ends of said openings at a point substantially horizontally in line with said horizontal openings.

While this castor has been very successful in practice certain difficulties are sometimes experienced. In particular it is necessary to form said openings with a fairly high degree of accuracy. Moreover, when the braking surface deforms the tyre above a certain load the axle seats on the upper surfaces of the openings and any greater load does not increase the braking force. The braking force depends on the load. Substantially no load is taken on the axle but the load is transmitted through the wheel to the ground. If the openings are further enlarged vertically to obtain greater braking load, a wedging action occurs which makes it difficult to release the brake.

According to the present invention the openings are made of constant depth so that the axle has substantially no vertical play and the cam slots are shaped in such a manner that movement of the cam plates by the user to the brake-on position causes the braking surface to engage the wheel firmly even when not loaded, the load being then shared by the axle and the wheel.

Thus the cam surfaces of the slots press the wheel directly on to the braking surface. By actual tests we have found that the braking effect is practically the same when the castor is under substantially no load as when it is loaded up to full load e.g. 600 lbs. whereas with the castor of British Patent 882617 the braking is very effective under high load but is too small at substantially no load to be acceptable in certain conditions especially after some wear on the braking surface. With the present invention a greater amount of wear of the braking surface can be tolerated. Wear is also less with the present invention because no relative movement accurs between the braking surface and the wheel after they have been engaged whereas with the castor of British Patent 882617 some such relative movement does occur e.g. when a workman is getting on and off a light weight staging fitted with the castors.

Preferably the braking surface is provided by an abutment which is provided at such a position that it contacts the wheel (i.e. in the brake-on position) within an arc extending from 10° to 80°, offset from the top of the wheel on the forward side of the castor i.e. the side of the axle remote from the pivot of the cam plates, the cam plates having a handle which extends below the abutment.

The abutment may be formed by turning down the front part of a plate that connects the wheel carrying plates together, or by a separate bar located below that abutment. The separate bar is preferred especially if the wheel carrying plates are formed integrally by pressing a plate into an approximately U-shaped section; the bar then serving to strengthen and stiffen this plate section.

A castor made in accordance with the invention is illustrated in the accompanying diagrammatic drawings by way of example.

In the drawings:

FIG. 4 is a sectional view on the plane 4—4 on FIG. 2; and

FIG. 5 is a sectional view on the plane 5-5 on FIG. 2.

Figure 1:
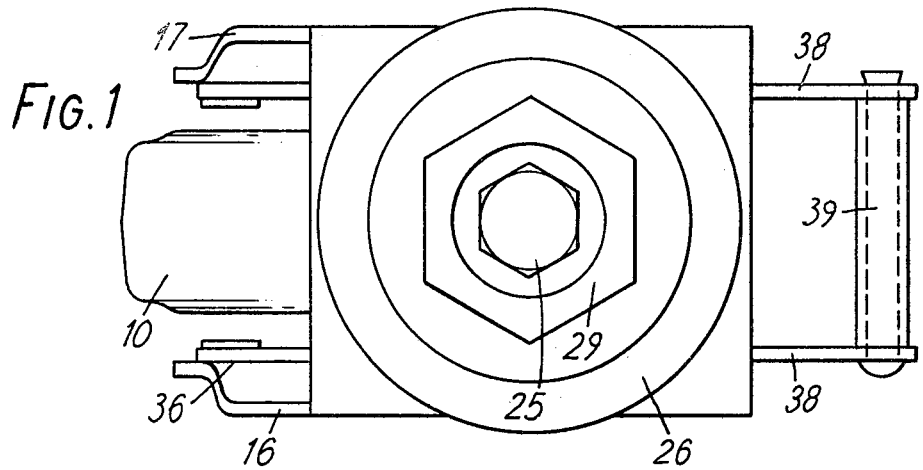
FIG. 1 is a plan view of a castor made in accordance with the invention.

A castor wheel 10 is mounted on a bearing sleeve 12 on an axle 11 that extends on both sides of the wheel through openings 14 in a pair of axle carrying plates 16, 17. Locknuts 18, 19 are threaded on the outer ends of the axle. The plates 16, 17 are connected integrally at their upper ends by a cross-piece 20. The plates 16, 17 and cross-piece 20 may be made by pressing rolled steel plates. The cross-piece 20 is deformed top and bottom to provide annular grooves to serve as races containing ball bearings 22, 23 respectively above and below the cross-piece 20. A stud 25 clamps corresponding bearing race plates 26, 27 on the ball bearings 22, 23, these race plates being spaced apart by a spacing bush 28. These race plates have corresponding annular grooves. The stud 25 is attached to an internally threaded sleeve 29 which can be screwed on to the leg of a builders' staging, hospital bed or the like.

The openings 14 are of constant vertical width slidably engaging the axle sleeve 12 at all times.

Two cam plates 32, 33 are located against the inside surfaces of the axle carrying plates 16, 17. These cam plates have cam slots 34 cut in them in which the axle sleeve 12 engages. The cam plates are pivoted at 36 to the side plates 16, 17. The cam plates extend as arms 38 on the opposite side to the pivot 36 and carry a bar 39 to form in effect a pedal on which the user's foot can be placed to depress it to effect braking. The side plates 16, 17 carry a steel braking bar 40.

Figure 3:
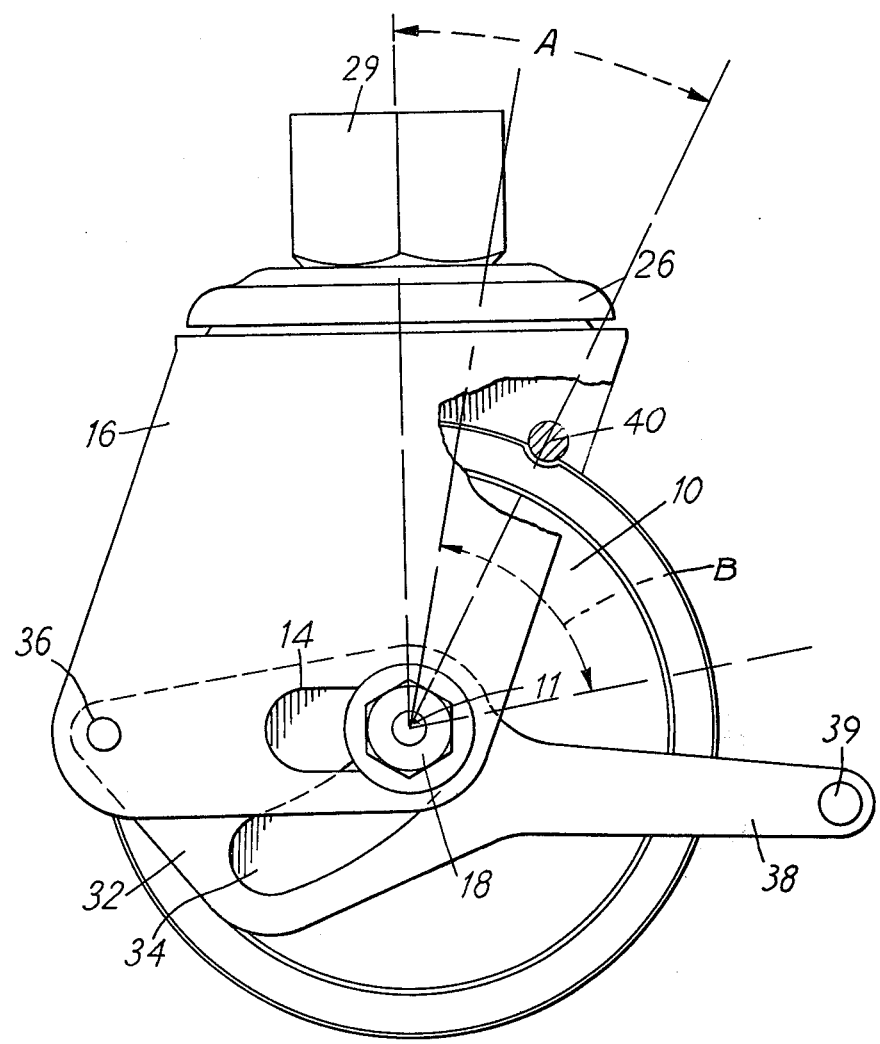
FIG. 3 is a similar side elevation but in the braked condition.

When the pedal bar 39 is raised the axle is at the lower end of the cam slots and located to one side of the vertical plane containing the axis of the wheel. When the pedal bar 39 is depressed the cam slots move the axle 11 along the bearing openings until the axle is directly or nearly below the axis of the spindle. The cam slots effect relative movement between the wheel and the wheel carrying device 16, 17, 20, 25, 29 so as to bring the braking bar 40 firmly into engagement with the wheel 10 irrespective of any load on the device. The sleeve 12 remains in contact with the edges of the slots 14 so that load is transmitted through the axle and sleeve 12 to the wheel carrying device. The geometry of the various parts is such that the braking bar 40 firmly engages the wheel some distance below its uppermost part and above the horizontal even under no load. The braking bar or abutment 40 as shown in the drawing is located at about 27° from the top of the wheel in the forward side of the castor as shown at A in FIG. 3. The abutment could however be located at a greater or less angle, e.g. from 10° or 80° as shown at B in FIG. 3.

Figure 2:
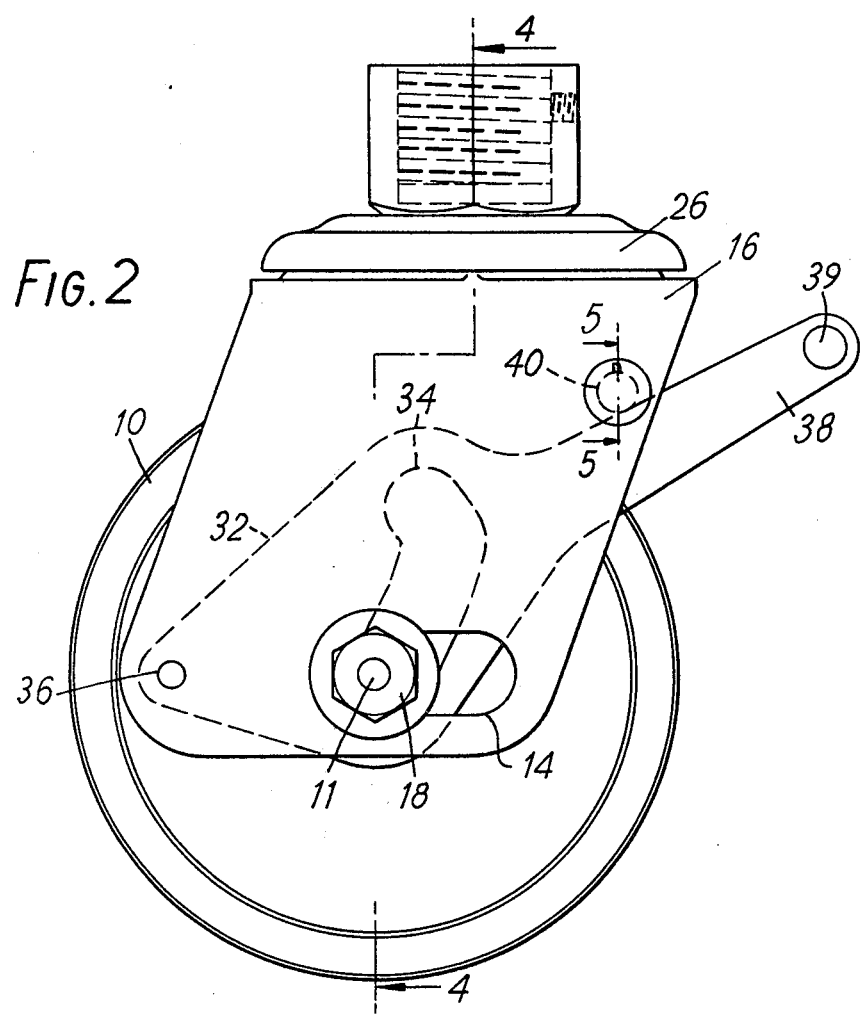
FIG. 2 is a side elevation thereof in the free condition of the wheel.

The braking bar also serves as a stop to be engaged by the arms 38 in its upper position as shown in FIG. 2.

With this construction a greatly increased braking action has been achieved.

I claim:

1. A castor comprising a wheel carrying device including an upright spindle, wheel carrying plates spaced apart from each other and carried by the lower end of the spindle, a wheel having an axle, said axle extending horizontally through horizontally elongated openings in the plates, a wheel braking surface carried by said device between said plates, a pivot having a fixed axis extending through the axle-carrying plates and said axis being parallel with the axle to one side thereof, and cam plates pivoted on said pivot, said cam plates having elongated cam slots extending at a substantial angle to the elongated openings, said slots being engaged by the wheel axle and of such shape as to move the wheel axle along the elongated openings during pivoting of said cam plates, said axle moving from a position where the wheel is spaced from the braking surface to a position where the wheel is engaged by said braking surface, said openings being made of constant depth so that the axle has substantially no vertical play, and the cam slots being shaped in such a manner that movement of the cam plates by the user to the brake-on position causes the braking surface and the wheel to be engaged firmly even when not loaded, the said elongated openings stopping short of passing beneath said braking surface whereby the load is shared by the axle and the surface.

2. A castor as claimed in claim 1 wherein the braking surface is provided by an abutment which is located at such a position that it contacts the wheel in the brake-on position within the arc taken about said axle and extending from 10° to 80° offset from the top of the wheel on the forward side of the castor, the cam plates having a handle which extends below the abutment.

3. A castor as claimed in claim 1 wherein the braking surface is provided by a bar mounted in the plates and located between them.

4. A castor as claimed in claim 2 wherein the braking surface abutment is located at such a position that it serves as a stop engaged by the handle extending from the cam plates.

* * * * *